(12) United States Patent
Yoshino (10) Patent No.: US 7,354,078 B2
(45) Date of Patent: Apr. 8, 2008

(54) PIPE JOINT DEVICE

(75) Inventor: Makoto Yoshino, Okazaki (JP)

(73) Assignee: DENSO Corporation, Kariya (JP)

( * ) Notice: Subject to any disclaimer, the term of this patent is extended or adjusted under 35 U.S.C. 154(b) by 200 days.

(21) Appl. No.: 10/997,128

(22) Filed: Nov. 24, 2004

(65) Prior Publication Data

US 2005/0110274 A1    May 26, 2005

(30) Foreign Application Priority Data

Nov. 25, 2003  (JP) ............................... 2003-394459

(51) Int. Cl.
*F16L 39/00*    (2006.01)
*F16L 35/00*    (2006.01)

(52) U.S. Cl. ........................... 285/319; 285/1; 285/83; 285/322

(58) Field of Classification Search ................ 285/319, 285/83, 322, 374, 321, 93, 1, 305, 921, 924
See application file for complete search history.

(56) References Cited

U.S. PATENT DOCUMENTS

| | | | |
|---|---|---|---|
| 3,603,621 A * | 9/1971 | Parsons ....................... 285/319 |
| 3,929,357 A * | 12/1975 | DeVincent et al. ......... 285/319 |
| 4,035,005 A * | 7/1977 | DeVincent et al. ......... 285/319 |
| 4,944,537 A | 7/1990 | Usui et al. ................... 285/319 |
| 5,083,819 A * | 1/1992 | Bynum ......................... 285/89 |
| 5,131,687 A * | 7/1992 | Marchou ...................... 285/23 |
| 5,211,427 A * | 5/1993 | Washizu ....................... 285/23 |
| 5,628,531 A * | 5/1997 | Rosenberg et al. ........... 285/81 |
| 5,630,570 A * | 5/1997 | Lacroix et al. .......... 251/149.9 |
| 5,647,612 A | 7/1997 | Yoshida et al. ............... 285/13 |
| 5,725,257 A * | 3/1998 | Sakane et al. ................ 285/81 |
| 5,765,877 A * | 6/1998 | Sakane et al. ................ 285/93 |
| 5,915,738 A * | 6/1999 | Guest .......................... 285/24 |
| 6,257,626 B1 * | 7/2001 | Campau ....................... 285/81 |

FOREIGN PATENT DOCUMENTS

| JP | 62-181788 | 11/1987 |
|---|---|---|
| JP | 2004-183703 | 7/2004 |

* cited by examiner

*Primary Examiner*—Gregory J. Binda
*Assistant Examiner*—Jay R Ripley
(74) *Attorney, Agent, or Firm*—Harness, Dickey & Pierce, PLC (57) ABSTRACT

An object of the present invention is to provide a pipe joint device, according to which two pipe members can be easily connected and disassembled without causing the abrupt discharge of the fluid from the pipe members. A ring shaped first retaining member is mounted on a second pipe member and comprises; a ring portion; multiple leg portions axially extending from the ring portion and circumferentially arranged at equal intervals; and multiple first retaining portions formed at each free end of the leg portions and projecting radially and inwardly, so that the first retaining portions are inserted into apertures of the second pipe member. The above first retaining portions return to the initial shape after a first pipe member has been completely inserted into the second pipe member, so that the first pipe member is axially retained by the first retaining portions at an outwardly expanded portion of the first pipe member.

12 Claims, 7 Drawing Sheets

PIPE JOINT DEVICE

CROSS REFERENCE TO RELATED APPLICATION

This application is based on Japanese Patent Application No. 2003-394459 filed on Nov. 25, 2003, the disclosures of which is incorporated herein by reference.

FIELD OF THE INVENTION

The present invention relates to a pipe joint device for connecting fluid pipe members having a male joint and a female joint, and in particular relates to a pipe joint device for pipe members for refrigerant of a refrigerating cycle for an automotive air-conditioning system.

BACKGROUND OF THE INVENTION

The inventor of this application has proposed a pipe joint device in another Japanese patent application No. 2002-348868 (Publication No. 2004-183703) before the present invention, which, however, has not been published before the present invention.

The proposed pipe joint device has a ring shape body and first and second retaining portions, which are respectively formed at both axial ends of the ring shape body and projecting radially and inwardly from the axial ends.

The above pipe joint is mounted on a second pipe member, in which the second retaining portions are radially and outwardly deformed (elastically expanded) when the second pipe member is inserted into the pipe joint device. Since the second pipe member has a female joint portion at its forward end, at which an outwardly expanded portion is formed, the pipe joint member is prevented from being removed from the second pipe member.

A first pipe member has a male joint portion at its forward end, at which an outwardly expanded portion is likewise formed. When the male joint portion is inserted into the female joint portion of the second pipe member, the first retaining portions are elastically deformed in a radial and outward direction. The first retaining portions return to initial shape due to elastic force, after the first pipe member has been completely inserted into the second pipe member, so that the first retaining portions are axially brought into contact with the outwardly expanded portion of the first pipe member, to firmly retaining the first pipe member to the second pipe member. Accordingly, an assembling of the first and second pipe members by the pipe joint member can be easily done in the above proposed device.

The inventor of the present invention has, however, found a drawback of the above proposed pipe joint device, when the pipe members will be disassembled. Namely, in the case that the pipe members are disassembled when the fluid (refrigerant) is filled in the pipe members and a high fluid pressure is existing in the pipe members, the pipe members would be rapidly put away from each other due to such a high pressure fluid, and the fluid would be discharged from the pipe members at a dash.

SUMMARY OF THE INVENTION

It is, therefore, an object of the present invention to provide a pipe joint device, according to which two pipe members can be easily connected and disassembled without causing the abrupt discharge of the fluid from the pipe members.

According to one of features of the present invention, a ring shaped first retaining member is mounted on a second pipe member and comprises; a ring portion; multiple leg portions axially extending from the ring portion and circumferentially arranged at equal intervals; and multiple first retaining portions formed at each free end of the leg portions and projecting radially and inwardly, so that the first retaining portions are inserted into apertures of the second pipe member.

The above first retaining portions return to the initial shape after a first pipe member has been completely inserted into the second pipe member, so that the first pipe member is axially retained by the first retaining portions at an outwardly expanded portion of the first pipe member.

According to another feature of the present invention, the pipe joint device has a second retaining member, which will be also mounted on the second pipe member and arranged in the inside of the first retaining member. The second retaining member comprises; a C-shaped ring portion; multiple leg portions axially extending from the ring portion and circumferentially arranged at equal intervals, so that each of the leg portions of the second retaining member is circumferentially arranged in respective grooves formed at the first retaining member; and multiple second retaining portions formed at each free end of the leg portions and projecting radially and inwardly.

The above second retaining portions return to the initial shape after the first pipe member has been completely inserted into the second pipe member, so that a space having a certain distance in the axial direction is formed between the second retaining portions and the outwardly expanded portion of the first pipe member, and thereby the first pipe member is axially retained by the second retaining portions at the outwardly expanded portion of the first pipe member when the first pipe member is axially moved by the above certain distance.

According to a further feature of the present invention, the first retaining portions can be axially movable in the apertures, when the internal fluid pressure in the pipe members is increased to a high pressure, so that the first retaining portions are further firmly retained by the first retaining member.

According to a further feature of the present invention, the second retaining portions are brought into contact with the outwardly expanded portion of the first pipe member, when the first pipe member is axially moved in a direction away from the second pipe member due to a high pressure of the fluid in the pipe members, in a process of disassembling the first pipe member from the second pipe member in which the first retaining portions are removed from the apertures of the second pipe member.

According to a further feature of the present invention, the first retaining portion of the first retaining member comprises: a straight portion to be in contact with an outer peripheral surface of the first pipe member; and a tapered portion extending from the straight portion toward the first pipe member.

According to a further feature of the present invention, the second retaining portion of the second retaining member comprises: a straight portion to be in contact with an outer peripheral surface of the first pipe member; and a tapered portion extending from the straight portion toward the first pipe member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A pipe joint device according to a first embodiment of the invention will be described with reference to FIGS. 1 to 7.

The pipe joint device according to the first embodiment is applied to a pipe joint device for pipe members of an automotive air-conditioning system.

Figure 1:
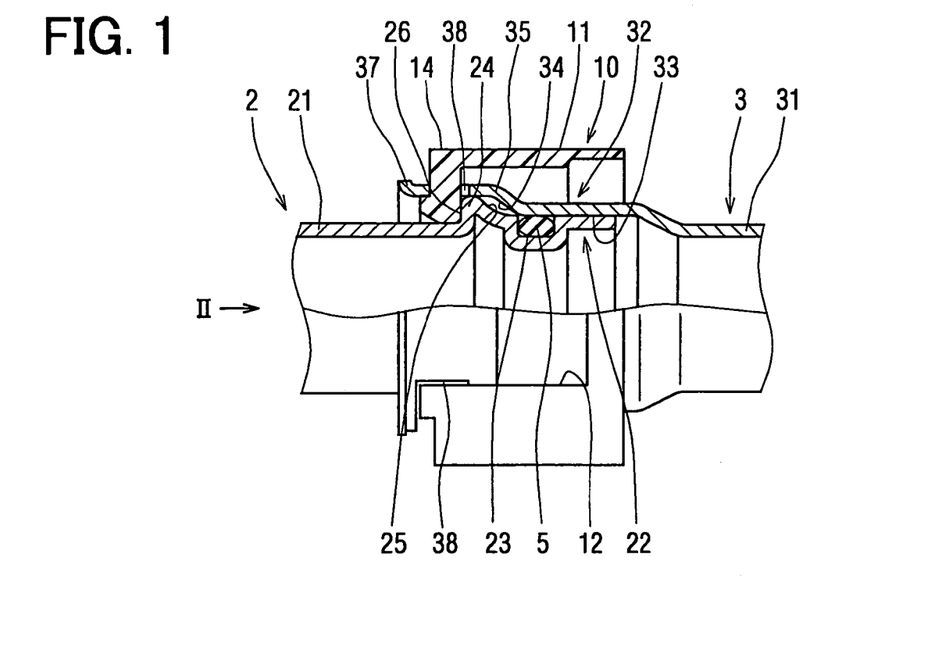
FIG. 1 is a partial cross sectional view showing an entire construction of a pipe joint device according to a first embodiment of the present invention.

In the pipe joint device of this embodiment, as shown in FIG. 1, a first pipe member 2 has a male joint and a second pipe member has a female joint, in which the first pipe member 2 is inserted into the second pipe member 3 and retained by a first retaining member 10. As described below, a pair of first retaining portions 14 of the first retaining member 10 are inserted into and engaged with respective apertures 38 formed in the second pipe member 3.

The first pipe member 2 is formed into a cylindrical shape for flowing a refrigerant therethrough, and has a male joint portion 22 at its end. The male joint portion 22 is radially and outwardly expanded to have a larger diameter than that of a cylindrical pipe portion 21. At the male joint portion 22, a circular groove 23 is formed, in which an O-ring 5 is fitted. An outwardly expanded portion 24 is further formed between the groove 23 and the pipe portion 21, so that a tapered outer surface 25 is formed at a front side of the expanded portion 24 (between the expanded portion 24 and the groove 23) and the tapered outer surface 25 is converged toward the forward end. A step surface 26 is formed between the expanded portion 24 and the pipe portion 21 arranged on a back side of the expanded portion 24, wherein the step surface works as a rear end retaining surface 26 for retaining the first retaining portions 14 of the first retaining member 10.

On the other hand, the second pipe member 3 is likewise formed into a cylindrical shape for flowing the refrigerant therethrough, and has a female joint portion 32 at its end. The female joint portion 32 is radially and outwardly expanded from a cylindrical pipe portion 31 to form an outwardly expanded portion 35, an insertion portion 33 into which the male joint portion 22 is inserted, and a tapered inner surface 34 between the outwardly expanded portion 35 and the insertion portion 33. The tapered inner surface 34 will be brought into contact with the tapered outer surface 25, when the first pipe member 2 is firmly inserted into and held by the second pipe member 3. The female joint portion 32 further has a longitudinally extended cylindrical portion 37, which extends from the outwardly expanded portion 35 and at which a pair of apertures 38 are formed opposing to each other in a radial direction. An outer diameter of the longitudinally extended cylindrical portion 37 is made almost equal to an outer diameter of the outwardly expanded portion 35. And as described below, the pair of first retaining portions 14 of the first retaining member 10 are respectively inserted into the pair of apertures 38.

Figure 2:
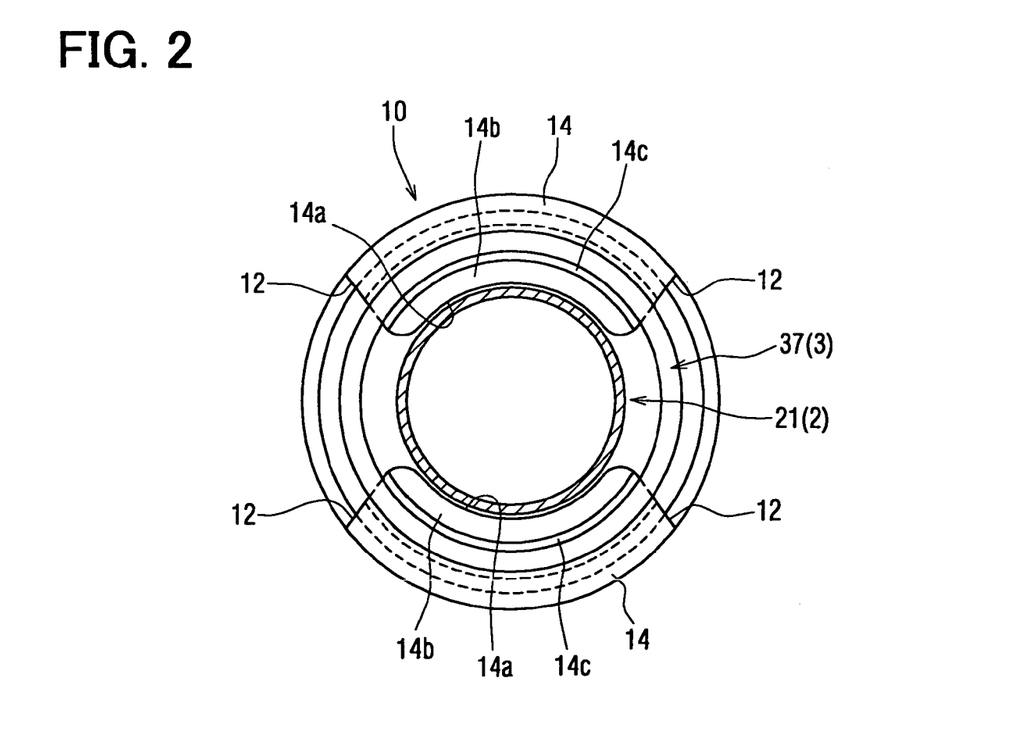
FIG. 2 is a view of the pipe joint device of FIG. 1, when viewed in a direction of arrow II in FIG. 1.
Figure 3A:
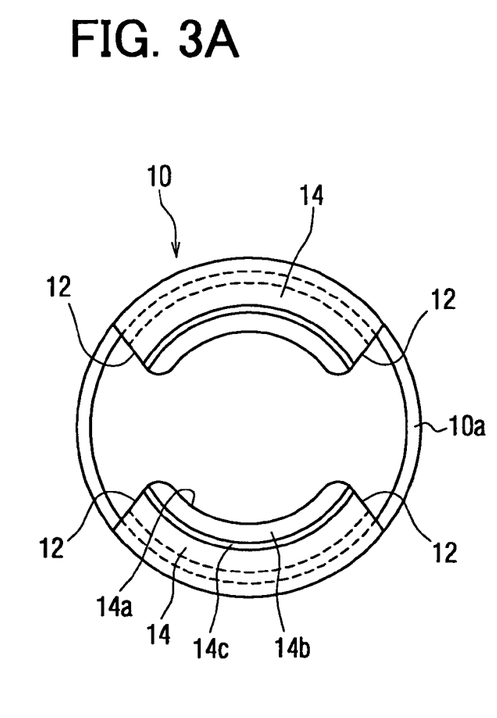
FIGS. 3A and 3B are respectively a front view and a partial cross sectional view showing an entire construction of a first retaining member 10 according to the first embodiment.
Figure 3B:
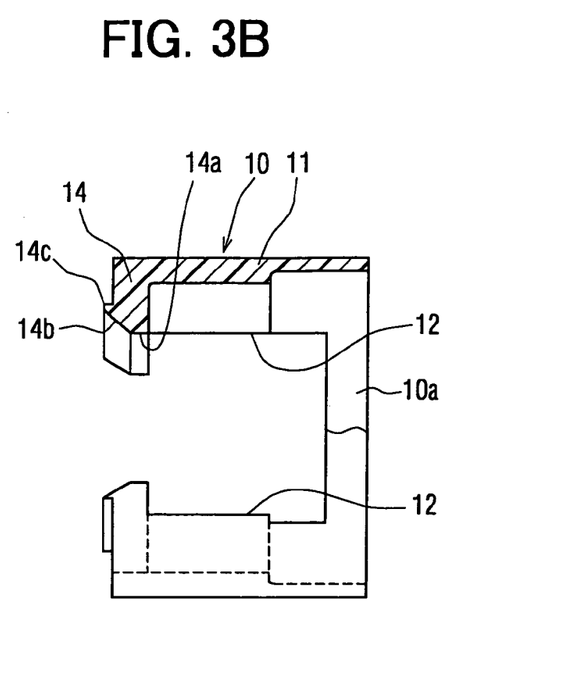

As shown in FIG. 2 and FIGS. 3A and 3B, the first retaining member 10 is integrally made of a resin material, a metallic material or a mixture of a resin material and a metallic material, so that the first retaining member 10 is elastically deformable in an axial and radial directions. The retaining member 10 is formed into a ring shape, having a thin walled ring portion 10a and a pair of leg portions 11 longitudinally extending from the ring portion 10a. The pair of leg portions 11 are formed by forming grooves 12 opposing to each other in a radial direction.

A pair of retaining portions 14, which project radially and inwardly, are formed at free ends of the respective leg portions 11, so that each of the retaining portions 14 has an arc shape. Each of the retaining portion 14 has a longitudinally straight portion 14a at its inner surface, a tapered portion 14b having a diameter enlarged from the straight portion 14a toward a forward end, and a protruded portion 14c at the forward end.

As shown in FIG. 1, retaining means in the form of an outer arc-shaped surface of the protruded portion 14c is in contact with an inner surface of the longitudinally extended cylindrical portion 37, when a fluid pressure in the first and second pipe members 2 and 3 (after they are connected to each other and the refrigerant is filled in the pipe members) is at a high value, so that the first retaining member 10 is retained in the apertures 38 of the second pipe member 3.

Figure 4:
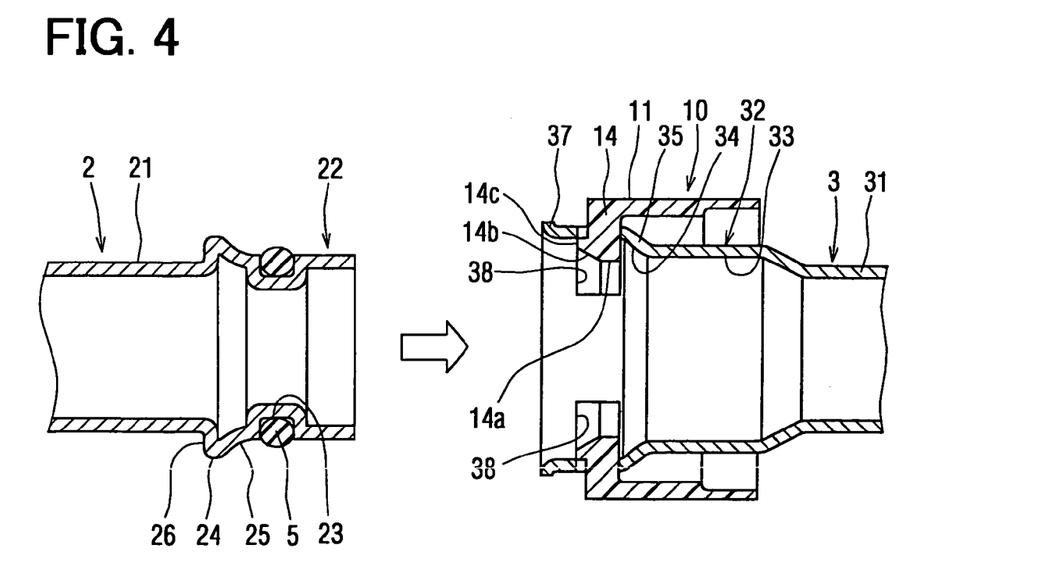
FIG. 4 is a cross sectional view showing a first and a second pipe members 2 and 3 of the first embodiment, before the first pipe member 2 is inserted into the second pipe member 3.
Figure 5:
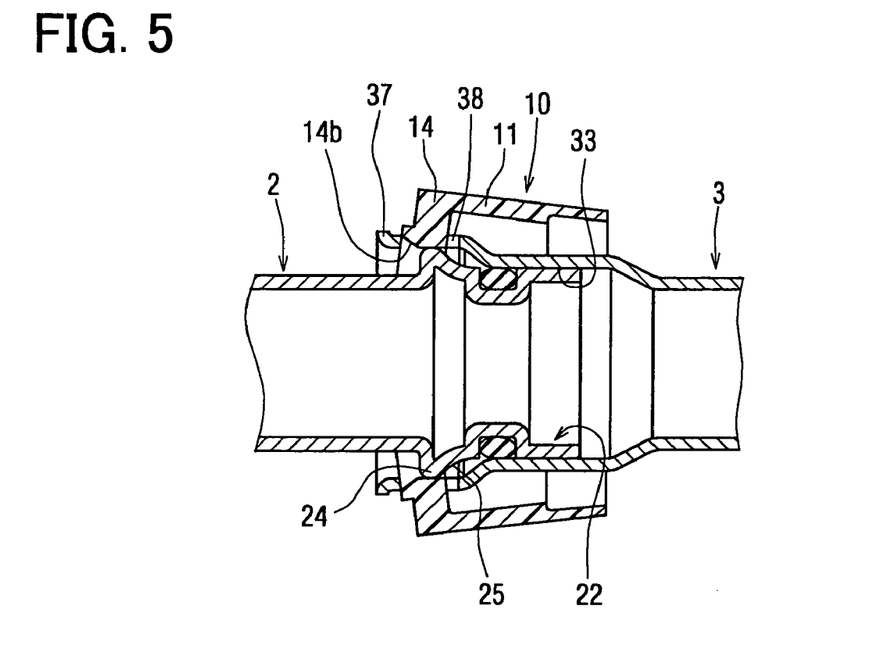
FIG. 5 is a cross sectional view showing the pipe joint device of the first embodiment, which is in a state when the first pipe member 2 is being inserted into the second pipe member 3.

A method of assembling the pipe joint device of the first embodiment will be described with reference to FIG. 1 and FIG. 4 to FIG. 6. First of all, the first retaining member 10 is mounted on the second pipe member 3, so that each of the first retaining portions 14 is respectively inserted into the apertures 38 of the second pipe member 3, as shown in FIG. 4. Then, the male joint portion 22 of the first pipe member 2 is arranged at a position to face to the cylindrical portion 37 of the second pipe member 3, and the male joint portion 22 of the first pipe member 2 is inserted into the cylindrical portion 37, as shown in FIG. 5.

The forward end of the male joint portion 22 is housed in the insertion portion 33 of the second pipe member 3. When the male joint portion 22 is further inserted into the insertion portion 33, the expanded portion 24 and the tapered outer surface 25 of the first pipe member 2 push outwardly the tapered portion 14b of the first retaining member 10, so that the first retaining portions 14 are elastically deformed in a radial and outward direction, which is a direction in that the first retaining portions would come out of the apertures 38, as shown in FIG. 5.

Figure 6:
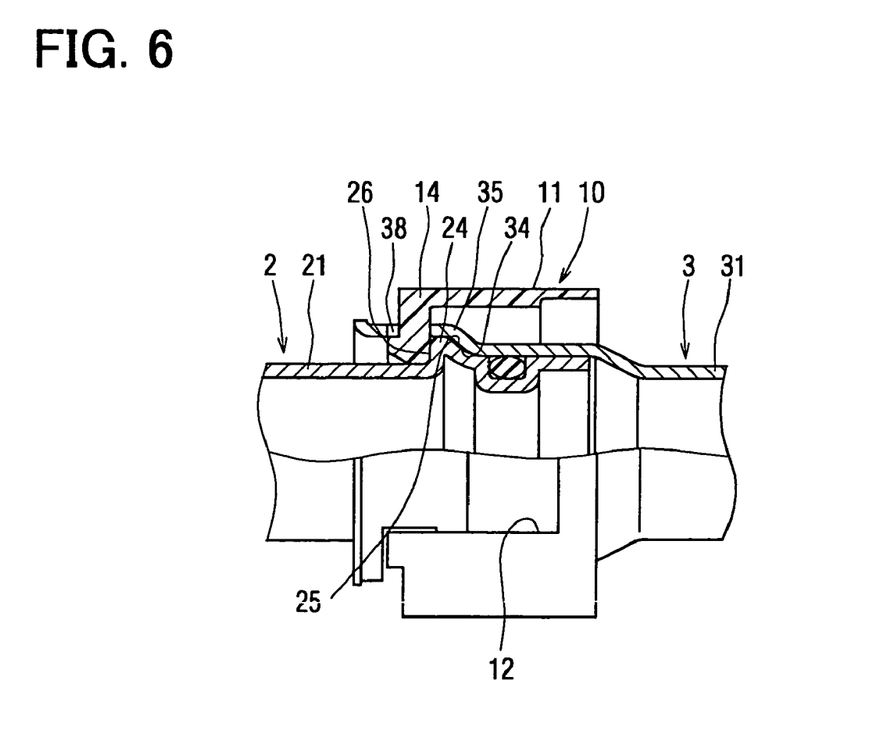
FIG. 6 is a cross sectional view showing the pipe joint device of the first embodiment, in which the first pipe member 2 has been inserted into the second pipe member 3.

When the tapered outer surface 25 formed on the first pipe member 2 comes into abutment against the tapered inner surface 34 formed on the second pipe member 3, as shown in FIG. 6, the first retaining member 10 elastically returns to its initial shape, so that the first retaining portions 14 are inserted into the apertures 38 of the second pipe member 3. At this position of the first retaining member 10, inner walls of the retaining portions 14 come into engagement with rear end retaining surface of the first pipe member 2 and the straight portions 14a of the retaining portions 14 are retained on the outer circumferential surface of the first pipe member 2 (the cylindrical pipe portion 21). As a result, the retaining portions 14 are supported by the apertures 38 formed in the second pipe member 3, and thereby the first and second pipe members 2 and 3 are connected, in which a relative movement of the first pipe member 2 to the second pipe member 3 in the axial direction is limited by the engagement of the retaining portions 14 with the apertures 38.

When the refrigerant is filled into the first and second pipe members 2 and 3 and the internal fluid pressure becomes higher, the first pipe member 2 is axially moved by the internal pressure (in a direction away from the second pipe member 3), as shown in FIG. 1, the protruded portions 14c of the first retaining portions 14 are retained by the apertures 38. As a result, the first retaining portions 14 of the first retaining member 10 cannot be removed from the apertures 38. In other words, the first retaining portions 14 cannot be disassembled from the apertures 38, so long as the internal fluid is left and thereby a high pressure of the fluid is existing in the pipe members 2 and 3. Therefore, the disassembly of the pipe members 2 and 3 can be possible only after the residual pressure at the connected portion is released.

In this embodiment, the single groove 23 to fit the O-ring 5 is formed in the joint portion 22 of the first pipe member 2. The construction should not be limited to the single groove but may have two or more grooves 23, so that the plural O-rings 5 may be fitted in those grooves 23 to further increase a hermetical seal between the joint portion 22 and the insertion portion 33.

Furthermore, the first retaining member 10 of this embodiment is provided with two leg portions 11, which are circumferentially spaced at equal distance by the grooves 12. However, any other number (three of four) of leg portions 11 can be provided at the retaining member 10, wherein those leg portions are preferably arranged circumferentially at equal distance.

Figure 7:
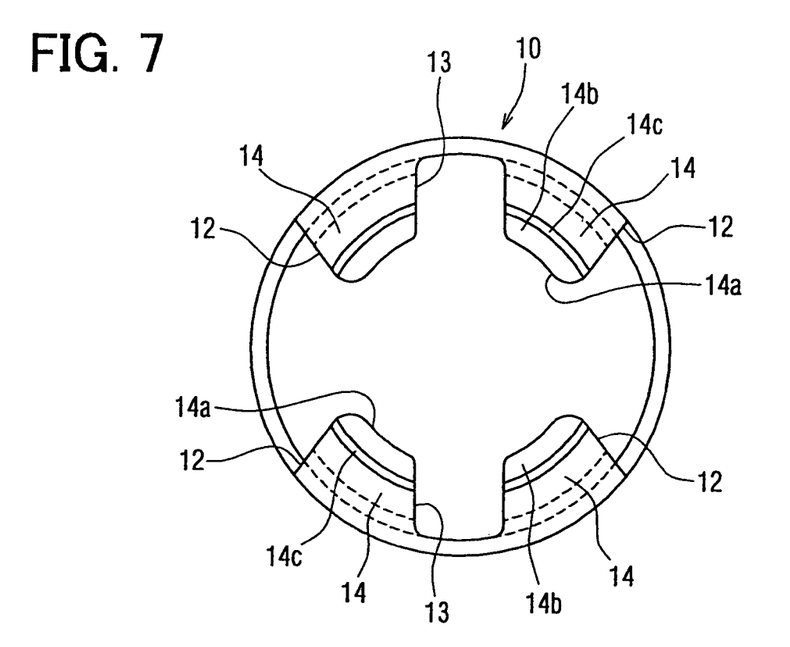
FIG. 7 is a front view showing a modification of a first retaining member 10 of the first embodiment.

As shown in FIG. 7, groove portions 13 can be formed at circumferential middle positions of the first retaining portions 14, so that each of the retaining portions 14 is divided into two parts, thereby to form four first retaining portions 14. In such a modification, four apertures 38 may be formed in the second pipe member 3 (at corresponding positions of the extended cylindrical portion 37).

According to the pipe joint device of the first embodiment, the leg portions 11 are elastically and outwardly deformed when the retaining portions 14 come into contact with the outwardly expanded portion 24 of the first pipe member 2, so that the male joint portion 22 of the first pipe member 2 is inserted into the female joint portion 32 of the second pipe member. And the retaining member 10 returns to its initial shape due to its elastic force, when the male joint portion 22 is completely inserted into the female joint portion 32, so that the retaining portions 14 are inserted into the respective apertures 38 of the female joint portions 32, wherein the inner surfaces of the retaining portions 14 are in contact with the rear end retaining surface 26 of the outwardly expanded portion 24 of the male joint portion 22.

As above, the first pipe member 2 can be inserted into and fixed to the second pipe member 3 by a simple and single action so that the assembling work can be easily done for a short time period.

Furthermore, the first pipe member 2 can be moved in the axial direction away from the second pipe member 3, when the internal fluid pressure of the refrigerant is increased to a higher pressure, and thereby the retaining member 10 is more firmly fixed to the first and second pipe members 2 and 3. Namely, the protruded portions 14c are engaged with peripheral portions of the apertures 38. Accordingly, the retaining member 10 can not be disassembled from the first and second pipe members 2 and 3, so long as the internal fluid pressure remains at a high value.

In other words, the disassembly for removing the first retaining portions 14 can be done only after the residual pressure is eliminated. Therefore, the internal fluid is not released at a dash at the disassembling process.

As already explained, the leg portions 11 of the retaining member 10 is elastically and outwardly deformed when the first pipe member 2 is inserted into the second pipe member 3. Since the tapered outer surface 25 is formed at the male joint portion 22, and the tapered portion 14b is likewise formed at the retaining portion 14, which are brought into contact with each other during the insertion process, the insertion process can be further easily done.

Since the retaining member 10 is made of elastic material having elastic force in the radial and axial direction, the retaining member 10 can be closely retained on the outer circumference (i.e., the cylindrical portion 21) of the first pipe member 2, thereby to improve the gas-tightness without any damage of the leg portions 11.

Second Embodiment

In the first embodiment, the retaining means in the form of the protruded portions 14c which are formed at the retaining portions 14, in a manner that the protruded portions 14c protrude from the retaining portions 14 toward the first pipe member 2. And when the first pipe member 2 is axially moved in the direction away from the second pipe member 3, the protruded portions 14c become engagement with the peripheral portions of the apertures, so that the retaining member 10 is much more firmly fixed to the first and second pipe members 2 and 3.

Figure 8:
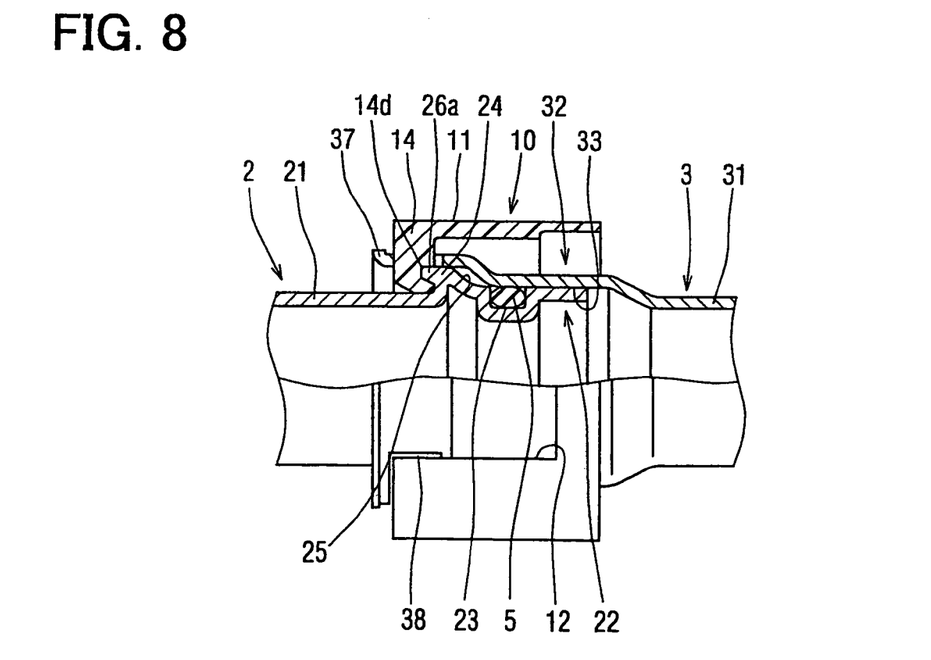
FIG. 8 is a partial cross sectional view showing an entire construction of a pipe joint device according to a second embodiment of the present invention.

According to the second embodiment of the present invention, as shown in FIG. 8, the retaining means includes a groove 14d is formed at the inner surface of the retaining portion 14, and a projection 26a is formed at the rear end retaining surface 26, so that the projection 26a will be engaged with the groove 14d, when the first pipe member 2 is axially moved in the direction away from the second pipe member 3.

As a result, the same effect to the first embodiment can be obtained in the second embodiment.

Third Embodiment

According to the third embodiment of the present invention, a second retaining member 40 is provided for gradually releasing the internal pressure in the first and second pipe members 2 and 3, when the first retaining member 10 is to be removed from the apertures 38 while the internal pressure is still high. The third embodiment will be described with reference to FIG. 9 to FIG. 14.

Figure 9:
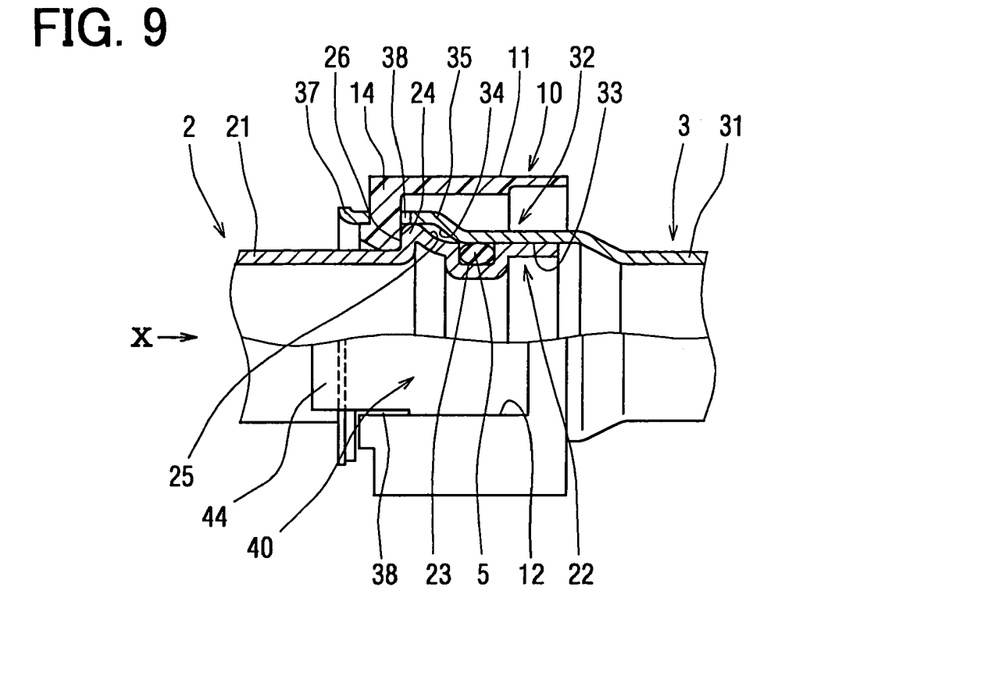
FIG. 9 is a partial cross sectional view showing an entire construction of a pipe joint device according to a third embodiment of the present invention.
Figure 10:
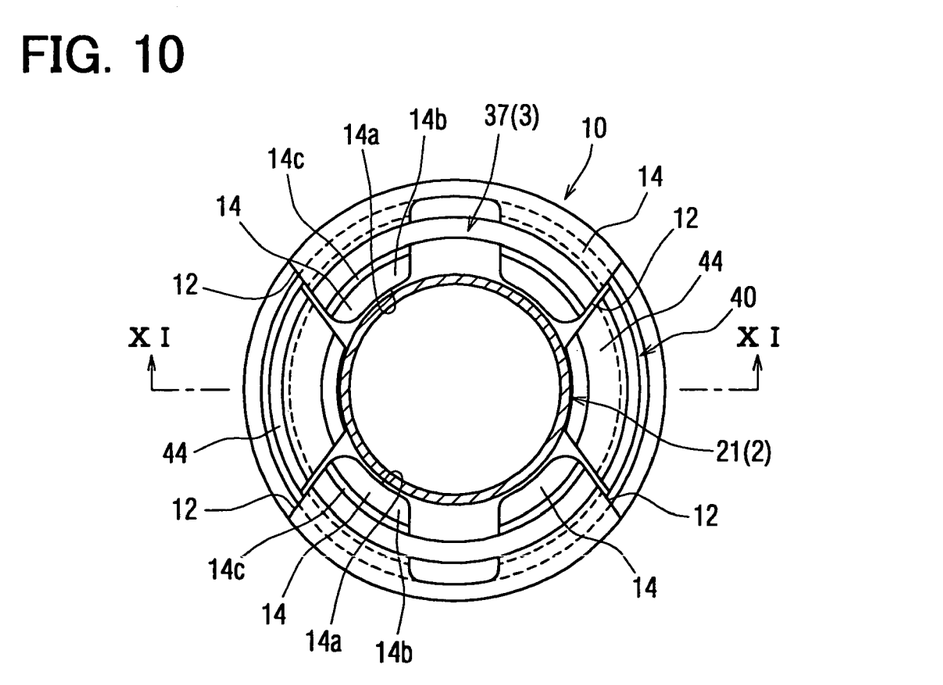
FIG. 10 is a view of the pipe joint device of FIG. 9, when viewed in a direction of arrow X in FIG. 9.
Figure 11:
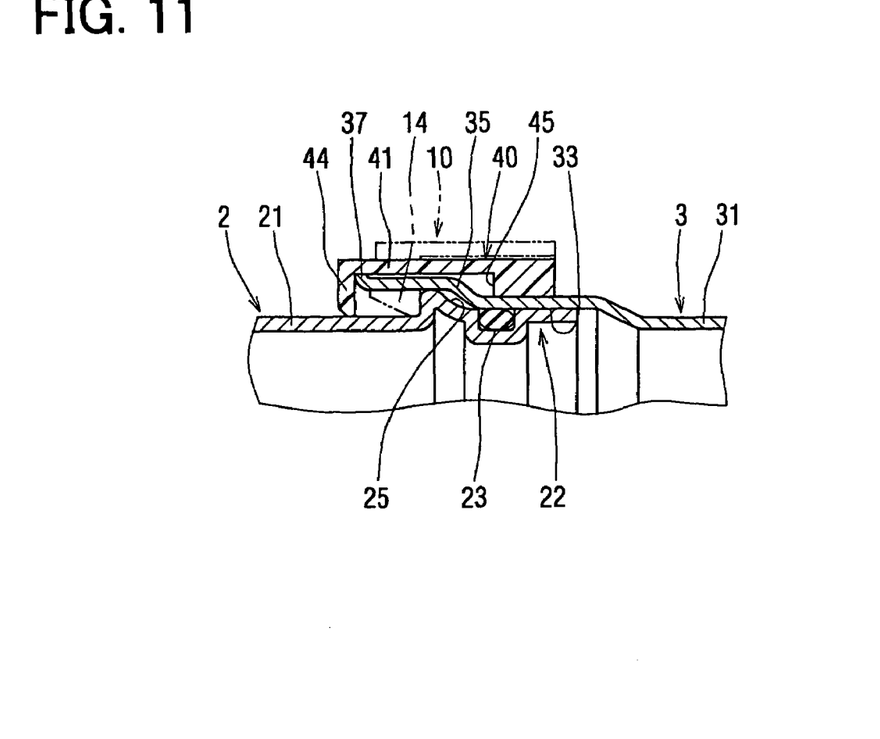
FIG. 11 is a cross sectional view of the pipe joint device taken along a line XI-XI in FIG. 10.

As shown in FIG. 9 to FIG. 11, the second retaining member 40 is disposed in the inside of the first retaining member 10 and a pair of second retaining portions 44 are arranged between the first groove portions 12 of the first retaining member 10.

And as shown in FIG. 11, the second retaining member 40 is arranged on the outer surface of the second pipe member 3, and the second retaining portions 44 are in contact with the forward end of the second pipe member 3.

Figure 12A:
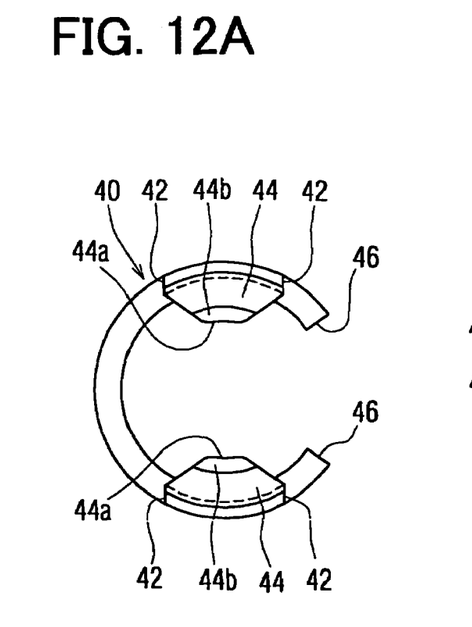
FIGS. 12A and 12B are respectively a front view and a partial cross sectional view showing an entire construction of a second retaining member 40 according to the third embodiment.
Figure 12B:
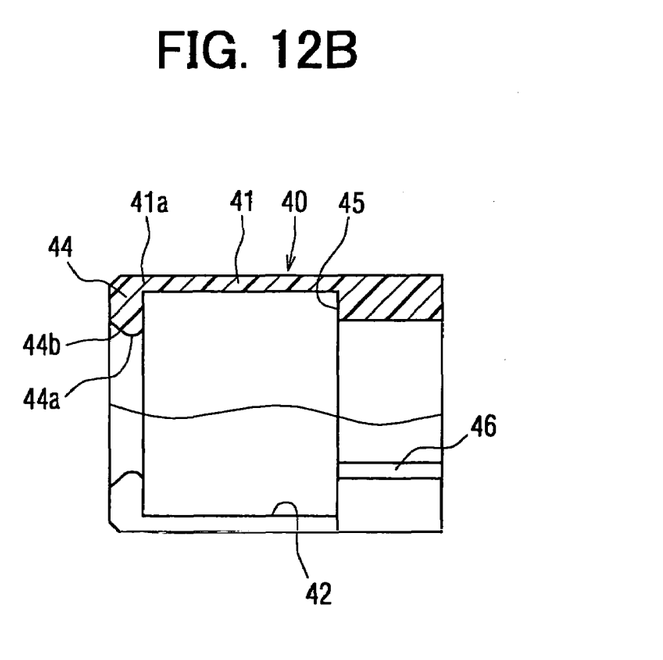

As shown in FIGS. 12A and 12B, the second retaining member 40 is integrally formed of a resin material, a metallic material or a mixture of a resin material and a metallic material, as in the same manner to the first retaining member 10, so that the second retaining member 40 is elastically deformable in an axial and radial directions.

The retaining member 40 is formed into an almost ring shape, having a C-shaped ring portion 45 and a pair of leg portions 41 longitudinally extending from the ring portion 45. The pair of leg portions 41 are formed by forming grooves 42 opposing to each other in a radial direction.

A pair of second retaining portions 44, which project radially and inwardly, are formed at free ends of the respective leg portions 41, so that each of the second retaining portions 44 has an arc shape. Each of the second retaining portions 44 has a longitudinally straight portion 44a at its inner surface and a tapered portion 44b having a diameter enlarged from the straight portion 44a toward a forward end.

The C-shaped ring portion 45 is formed of a heavy-walled portion on the opposite side to the second retaining portions 44, and the C-shaped ring portion 45 is formed as a third retaining portion. The third retaining portion 45 is retained by the outwardly expanded portion 35 of the female joint portion of the second pipe member 3, when the first retaining portions 14 of the first retaining member 10 are made out of engagement from the apertures 38 of the second pipe member 3 to disassemble the first retaining member 10 from the pipe members 2 and 3, and when the second retaining portions 44 are brought into contact with the rear end retaining surface 26 of the first pipe member 2.

The C-shaped ring portion 45 has an opening 46, which can be elastically and radially deformed so that the second retaining member 40 can be mounted to the outer circumference of the second pipe member 3.

A method of assembling the pipe joint device of the third embodiment will be described with reference to FIG. 9, FIG. 11, FIG. 13 and FIG. 14.

Figure 13:
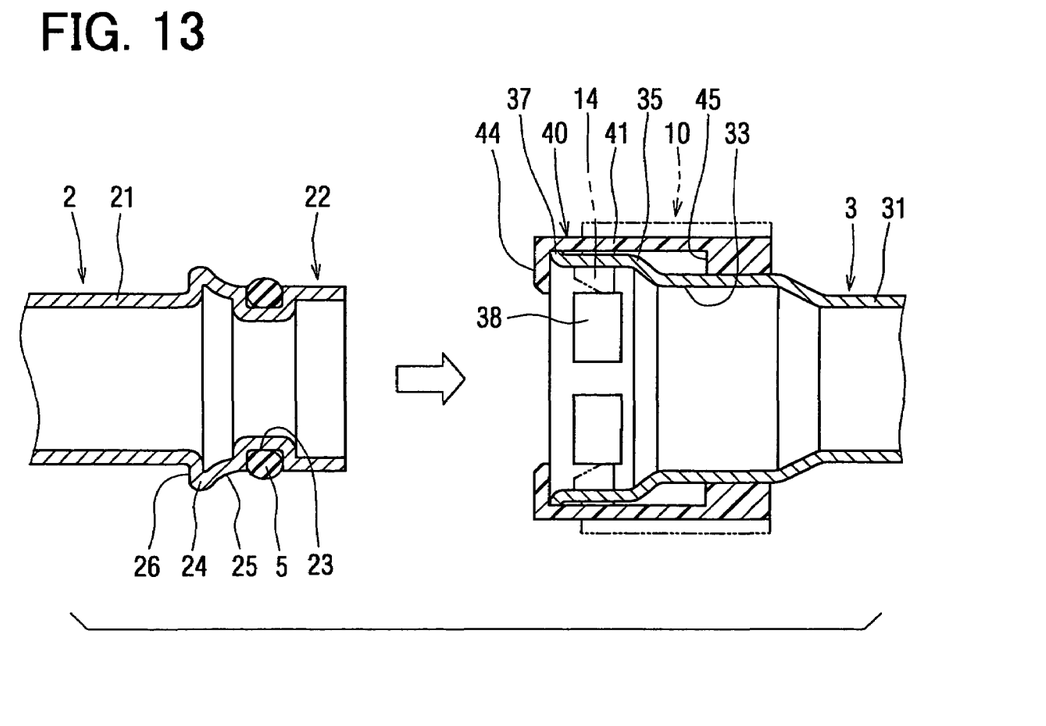
FIG. 13 is a cross sectional view showing the first and second pipe members 2 and 3 of the third embodiment, before the first pipe member 2 is inserted into the second pipe member 3.

First of all, the second retaining member 40 is mounted on the second pipe member 3, as shown in FIG. 13, wherein the second retaining portions 44 are retained by the forward end of the second pipe member 3. Then, the first retaining member 10 is mounted on the second retaining member 40 and the second pipe member 3, as shown by a two-dot-chain line in FIG. 13, wherein the pair of leg portions 41 of the second retaining member 40 are arranged at the pair of grooves 12 formed at the first retaining member 10, and each of the first retaining portions 14 is respectively inserted into the apertures 38 of the second pipe member 3. As a result, the second retaining member 40 is mounted on the second pipe member 3 in the inside of the first retaining member 10.

Then, the male joint portion 22 of the first pipe member 2 is arranged at a position to face to the cylindrical portion 37 of the second pipe member 3, and the male joint portion 22 of the first pipe member 2 is inserted into the cylindrical portion 37, as in the same manner to that of the first embodiment.

The forward end of the male joint portion 22 is housed in the insertion portion 33 of the second pipe member 3. When the male joint portion 22 is further inserted into the insertion portion 33, the expanded portion 24 and the tapered outer surface 25 of the first pipe member 2 push outwardly the tapered portion 44b of the second retaining member 40, so that the second retaining portions 44 are elastically deformed in a radial and outward direction. When the male joint portion 22 is further inserted into the second pipe member, the expanded portion 24 and the tapered outer surface 25 likewise push the tapered portion 14b of the first retaining member 10.

When the male joint portion 22 is further inserted into the second pipe member 3, the second retaining portions 44 return to the initial shape due to the elastic force, so that the straight portions 44a of the second retaining portions 44 become in contact with the outer peripheral surface of the cylindrical pipe portion 21 of the first pipe member 2, and the inner surface of the second retaining portions 44 are kept in contact with the forward end of the second pipe member 3, as shown in FIG. 11.

And furthermore, when the second retaining portions 44 return to the initial shape after the first pipe member 2 has been completely inserted into the second pipe member 3, a space having a certain distance in the axial direction is formed between the second retaining portions 44 and the outwardly expanded portion 24 of the first pipe member 2.

When the first retaining member 10 returns to its initial shape due to the elastic force, the first retaining portions 14 are inserted into the apertures 38 formed in the longitudinally extended cylindrical portion 37 of the second pipe member 3. At this position of the first retaining member 10, the inner walls of the first retaining portions 14 come into engagement with the rear end retaining surface 26 of the first pipe member 2 and the straight portions 14a of the retaining portions 14 are retained on the outer circumferential surface of the first pipe member 2 (the cylindrical pipe portion 21).

As a result, the first retaining portions 14 are supported by the apertures 38 formed in the second pipe member 3, and thereby the first and second pipe members 2 and 3 are connected, in which a relative movement of the first pipe member 2 to the second pipe member 3 in the axial direction is limited by the engagement of the retaining portions 14 with the apertures 38, as in the same manner to the first embodiment.

A process of disassembling the first and second retaining members from the first and second pipe members. As in the same manner to the first embodiment, the first pipe member 2 is axially moved in the direction away from the second pipe member 3, when the internal pressure of the refrigerant becomes higher, so that the protruded portions 14c are engaged with the peripheral portion of the apertures 38. Accordingly, when the first retaining member 10 is to be removed from the apertures 38, while the internal pressure in the first and second pipe members is still high, the first pipe member 2 is axially moved in the opposite direction, so that the protruded portions 14c can be out of engagement with the apertures 38.

Figure 14:
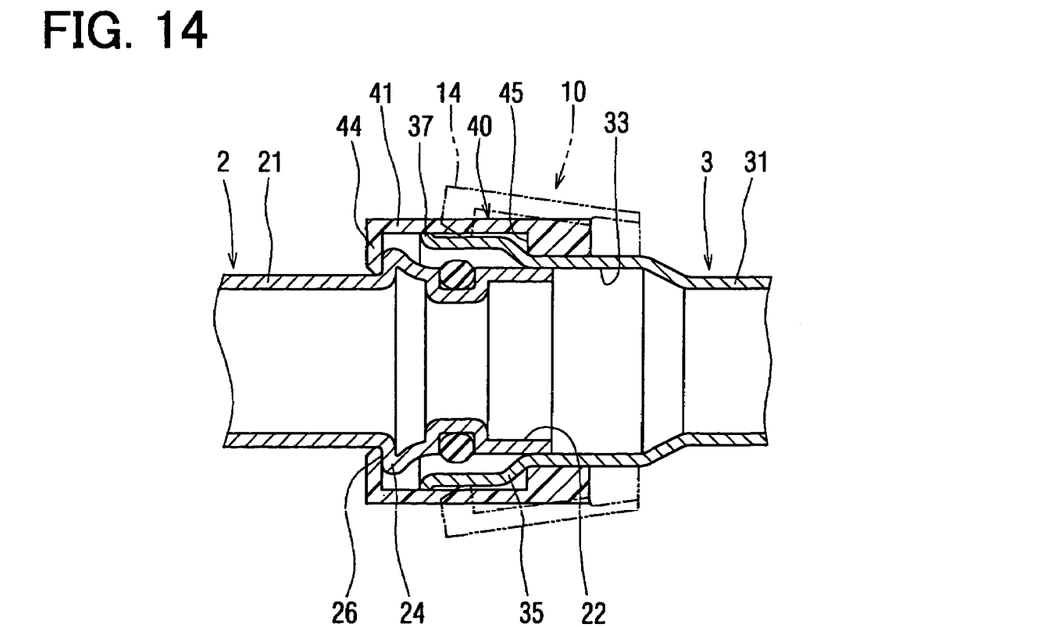
FIG. 14 is a cross sectional view showing the pipe joint device of the third embodiment, when the first pipe member 2 is detached from the second pipe member 3.

Then, when the first retaining member 10 has been removed from the apertures 38, as indicated by a two-dot-chain line in FIG. 14, the first pipe member 2 is axially moved, by the high internal pressure in the pipe members 2 and 3, in the direction away from the second pipe member 3. However, the first pipe member 2 is not completely detached from the second pipe member 3, because of the second retaining member 40. Namely, when the first pipe member is axially moved by a certain distance, the third retaining portion 45 of the second retaining member 40 comes into contact with the outwardly expanded portion 35 of the second pipe member 3, while the inner surface of the second retaining portions 44 are still in contact with the rear end retaining surface of the first pipe member 2, so that the first pipe member 2 is kept at such a position at which the forward end of the first pipe member 2 is still inserted into the insertion portion 33 of the second pipe member 3 but the O-ring 5 becomes out of the insertion portion 33 of the second pipe member 3.

As a result, the internal pressure is gradually discharged from the clearance between the insertion portion 33 and the male joint portion 22. When the internal pressure disappears, the disassembly of the first and second pipe member 2 and 3 is completed by removing the second retaining portions 44 from the rear end retaining face 26 (removing the second retaining member 40 from the second pipe member 3 by enlarging the opening 46 of the second retaining member 40).

According to the pipe joint device according to the third embodiment, the internal fluid is not discharged at a dash but can be gradually released, even when the pipe joint device (first and second pipes and the first and second retaining members) will be disassembled while the internal fluid pressure is still high because of the residual pressure.

Another Embodiment

In the above third embodiment, the pair of leg portions 41 of the second retaining member 40 are longitudinally extended from the C-shaped ring portion 45 in a direction from the second pipe member 3 to the first pipe member 2. It is, however, possible to reverse the extending direction of the leg portions 41. Namely, the second retaining member 40 can be so formed to have a C-shaped ring portion to be mounted on the pipe portion 21 of the first pipe member 2 and a pair of leg portions longitudinally extending from the ring portion toward the second pipe member 3, wherein the pair of second retaining portions 44 are respectively arranged at the grooves 12 of the first retaining member 10.

In the foregoing embodiments, the invention is applied to the coolant piping of the refrigerating cycle for the automotive air-conditioning system. However, the invention should not be limited to that application but can be applied to any piping for filling a fluid.

What is claimed is:

1. A pipe joint device comprising:
a first cylindrical pipe member having a male joint portion, at which an outwardly expanded portion is formed, wherein a tapered outer surface is formed at a front side of the outwardly expanded portion, and a step surface perpendicular to a central longitudinal axis defined by the first cylindrical pipe member is formed at a back side of the outwardly expanded portion;
a second cylindrical pipe member having a female joint portion, at which an outwardly expanded portion is formed, so that the male joint portion is inserted into the female joint portion;
the second pipe member further having a longitudinally extended cylindrical portion extending from the outwardly expanded portion toward the first pipe member, and multiple apertures formed in the longitudinally extending cylindrical portion;
a ring shaped first retaining member mounted on the second pipe member and having:
a first ring portion;
a first plurality of leg portions axially extending from the first ring portion and circumferentially arranged at equal intervals;
multiple first retaining portions, each first retaining portion being formed at a free end of each of the first plurality of leg portions and projecting radially inwardly, so that the first retaining portions are inserted into the apertures of the second pipe member; and
retaining means for prohibiting removal of the first retaining portions from the apertures of the second pipe member;
wherein each of the first retaining portions has a straight portion in contact with an outer peripheral surface of the first pipe member and a tapered portion extending from the straight portion such that the tapered portion is opposed to the tapered outer surface of the first pipe member during a process of inserting the male joint portion into the female joint portion,
wherein each of the first retaining portions further has a flat surface portion which is perpendicular to an axis of the ring shaped first retaining member and which is opposed to the step surface of the first pipe member after the male joint portion is inserted into the female joint portion,
wherein the tapered portion of the first retaining portion moves along the tapered outer surface of the first pipe member when the male joint portion is inserted into the female joint portion, so that the first retaining portions and the first plurality leg portions are elastically and outwardly deformed,
wherein the first retaining portions return to the initial shape after the first pipe member has been completely inserted into the second pipe member, so that the first pipe member is axially retained by the first retaining portions at the outwardly expanded portion of the first pipe member, and
wherein the first retaining portions are axially movable in the apertures when an internal fluid pressure in the pipe members is increased, so that the step surface of the first pipe member is brought into contact with the flat surface portion of the first retaining portions to prevent a further axial movement of the first retaining portions away from the second pipe member and that the retaining means prohibits the removal of the first retaining portion from the apertures of the second pipe member.

2. A pipe joint device according to claim 1 further comprising:
a ring shaped second retaining member mounted on the second pipe member and in the inside of the first retaining member, and having:
a second ring portion;
a second plurality of leg portions axially extending from the second ring portion and circumferentially arranged at equal intervals, so that each of the leg portions of the second retaining member is circumferentially arranged in a respective groove formed in the first retaining member; and
multiple second retaining portions formed at each free end of the second plurality of leg portions and projecting radially inwardly,
wherein the second retaining portions and the second plurality of leg portions are elastically and outwardly deformed when the male joint portion is inserted into the female joint portion, because of the outwardly expanded portion of the first pipe member, and
wherein the second retaining portions return to the initial shape after the first pipe member has been completely inserted into the second pipe member, so that a space having a predetermined distance in the axial direction is formed between the second retaining portions and the outwardly expanded portion of the first pipe member, and thereby the first pipe member is axially retained by the second retaining portions at the outwardly expanded portion of the first pipe member when the first pipe member is axially moved by the predetermined distance.

3. A pipe joint device according to claim 2, wherein
the second retaining portions are brought into contact with the outwardly expanded portion of the first pipe member, when the first pipe member is axially moved in a direction away from the second pipe member due to a pressure of a fluid in the pipe members, in a process of disassembling the first pipe member from the second pipe member in which the first retaining portions are removed from the apertures of the second pipe member.

4. A pipe joint device according to claim 2, wherein
each of the second retaining portions of the second retaining member comprises:
a straight portion in contact with an outer peripheral surface of the first pipe member; and
a tapered portion extending from the straight portion.

5. A pipe joint device according to claim 2, wherein
the second retaining portions are brought into contact with the outwardly expanded portion of the first pipe member, when the first pipe member is axially moved in a direction away from the second pipe member due to a pressure of a fluid in the pipe members, in a process of disassembling the first pipe member from the second pipe member in which the first retaining portions are removed from the apertures of the second pipe member.

6. A pipe joint device according to claim 2, wherein
at least one of the first and second retaining members is formed of an elastic material, so that it can be elastically deformed in a radial and axial direction.

7. A pipe joint device according to claim 1, wherein
the first retaining member is formed of an elastic material, so that it can be elastically deformed in a radial and axial direction.

8. The pipe joint device according to claim 1, wherein the retaining means comprises a surface on at least one of the multiple first retaining portions that extends in an axial direction of the second pipe member, the surface being disposed under the longitudinally extended cylindrical portion of the second pipe member to prohibit removal of the at least one of the multiple retaining portions.

9. The pipe joint device according to claim 8, wherein the surface is in contact with an inner surface of the longitudinally extending cylindrical portion.

10. The pipe joint device according to claim 1, wherein the retaining means comprises a stepped surface on at least one of the multiple first retaining portions, a portion of the stepped surface being disposed under the longitudinally extended cylindrical portion of the second pipe member to prohibit removal of the at least one of the multiple first retaining portions.

11. The pipe joint device according to claim 10, wherein the stepped surface is in contact with an inner surface of the longitudinally extending cylindrical portion.

12. The pipe joint device according to claim 1, wherein
the retaining means is provided by engaging portions formed in the first retaining portions and formed in the pipe member outwardly expanded portion to prohibit the removal of the first retaining portions by engaging each other,
the engaging portions are engaged when the first retaining portions are located in an engaging position and when the first pipe member is axially moved in a direction away from the second pipe member due to a pressure of a fluid in the pipe member, and
the engaging portions enable removal of the retaining portions when the first retaining portions are located at a position other than the engaging position.

* * * * *